(12) United States Patent
Kondo et al.

(10) Patent No.: US 7,312,280 B2
(45) Date of Patent: Dec. 25, 2007

(54) PROCESS FOR PRODUCING MODIFIED ETHYLENE-VINYLCYCLOHEXANE COPOLYMER RESIN

(75) Inventors: Shinichi Kondo, Ichihara (JP); Takashi Sanada, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 272 days.

(21) Appl. No.: 10/624,512

(22) Filed: Jul. 23, 2003

(65) Prior Publication Data

US 2004/0132620 A1 Jul. 8, 2004

(30) Foreign Application Priority Data

Jan. 7, 2003 (JP) ............................. 2003-000895

(51) Int. Cl.
C08F 8/46 (2006.01)
C08L 51/00 (2006.01)

(52) U.S. Cl. .................... 525/263; 525/333.3; 525/345

(58) Field of Classification Search ................ 525/263, 525/333.3, 345
See application file for complete search history.

(56) References Cited

U.S. PATENT DOCUMENTS 6,221,967 B1 * 4/2001 Rodriguez et al. .......... 525/274
2004/0204537 A1 * 10/2004 Mori et al. ................. 524/556

FOREIGN PATENT DOCUMENTS

| CN | 1336390 A | 6/2004 |
|---|---|---|
| EP | 1 197 501 A2 | 4/2002 |
| JP | 05-51512 A | 3/1993 |
| JP | 05-271482 A | 10/1993 |
| JP | 2003-160621 A | 6/2003 |
| WO | WO 03/014174 A1 * | 2/2003 |

OTHER PUBLICATIONS

Mani et al., STN AN :1993 :449973, 1993.*
Chinese Office Action issued Dec. 30, 2005.

* cited by examiner

Primary Examiner—Jeffrey Mullis
(74) Attorney, Agent, or Firm—Sughrue Mion, PLLC

(57) ABSTRACT

There is provided a process for producing a modified ethylene-vinylcyclohexane copolymer resin, which comprises the steps of:

(1) blending at least the following components (A) to (C) to produce a blend;
   (A) 100 parts by weight of an ethylene-vinylcyclohexane copolymer resin,
   (B) from 0.1 to 20 parts by weight of at least one compound selected from the group consisting of:
   (B1) a compound having in its molecule (i) at least one carbon-carbon double or triple bond and (ii) at least one polar group, and
   (B2) a compound having in its molecule (iii) an OR group and (iv) at least two same or different functional groups selected from the group consisting of a carboxylic acid group, an acid halide group, an acid anhydride group, an acid halide anhydride group, an acid ester group, an acid amide group, an imide group, an imido group, an amino group and a salt of an amino group, wherein the R is hydrogen, an alkyl group, an aryl group, an acyl group or a carbonyldioxy group, and
   (C) from 0.01 to 20 parts by weight of an organic peroxide, and
(2) melt-kneading said blend in a kneading apparatus to produce a modified thylene-vinylcyclohexane copolymer resin.

4 Claims, No Drawings

PROCESS FOR PRODUCING MODIFIED ETHYLENE-VINYLCYCLOHEXANE COPOLYMER RESIN

FIELD OF THE INVENTION

The present invention relates to a process for producing a modified ethylene-vinylcyclohexane copolymer resin having a large graft amount.

BACKGROUND OF THE INVENTION

An α-olefin resin has a problem that, for example, it has an insufficient adhesiveness, coating property and printing property with an inorganic material or a metal.

In order to solve said problem, there is generally known a method of melt-kneading in an extruder an α-olefin resin, a functional group-carrying compound and a radical-generating compound.

However, said method has a limit for raising a graft amount, because adding a large amount of the radical-generating compound results in a remarkable change of a melt flow rate (MFR) of a melt-kneading product.

In order to solve said problem, there are known (1) a method of adding styrene ("Design of Practical Polymer Alloy", page 51, written by Fumio Ide and published by Kogyo Chosakai (1996)), and (2) a method of adding divinylbenzene (JP-A-7-173229). However, both of these methods do not give a satisfactory result.

SUMMARY OF THE INVENTION

An object of th present invention is to provide a process for producing a modified ethylene-vinylcyclohexane copolymer resin having a large graft amount.

The present inventors have undertaken extensive studies to accomplish the above-mentioned object, and as a result, have found that a modified ethylene-vinylcyclohexane copolymer resin having a graft in a large amount can be produced by modifying an ethylene-vinylcyclohexane copolymer resin, and thereby the present invention has been obtained.

The present invention provides a process for producing a modified ethylene-vinylcyclohexane copolymer resin, which comprises the steps of:

(1) blending at least the following components (A) to (C) to produce a blend:
  (A) 100 parts by weight of an ethylene-vinylcyclohexane copolymer resin,
  (B) from 0.1 to 20 parts by weight of at least one compound selected from the group consisting of:
    (B1) a compound having in its molecule (i) at least one carbon-carbon double or triple bond and (ii) at least one polar group, and
    (B2) a compound having in its molecule (iii) an OR group and (iv) at least two same or different functional groups selected from the group consisting of a carboxylic acid group, an acid halide group, an acid anhydride group, an acid halide anhydride group, an acid ester group, an acid amide group, an imide group, an imido group, an amino group and a salt of an amino group, wherein the R is hydrogen, an alkyl group, an aryl group, an acyl group or a carbonyldioxy group, and
  (C) from 0.01 to 20 parts by weight of an organic peroxide, and (2) melt-kneading said blend in a kneading apparatus to produce a modified ethylene-vinylcyclohexane copolymer resin.

DETAILED DESCRIPTION OF THE INVENTION

In the present invention, the ethylene-vinylcyclohexane copolymer resin means a copolymer resin comprising at least an ethylene unit and a vinylcyclohexane unit, wherein a monomer unit such as the ethylene unit and the vinylcyclohexane unit means a unit of a polymerized monomer. A typical example of said ethylene-vinylcyclohexane copolymer resin is that containing only an ethylene unit and a vinylcyclohexane unit.

In the present invention, the vinylcyclohexane unit is contained in the ethylene-vinylcyclohexane copolymer resin in mount of preferably from 1 to 30% by mol. When said amount is less than 1% by mol, a graft amount is insufficient, and when said amount is more than 30% by mol, the obtained modified ethylene-vinylcyclohexane copolymer resin adheres to each other.

Examples of the polar group in the component (B1) are (1) an amide linkage contained in a polyamide resin, and (2) a functional group having affinity or chemical reactivity to a carboxyl group or an amino group present in a polymer terminal.

Examples of said functional group are a carboxylic acid group, an ester group of a carboxylic acid, an amide group thereof, an anhydride group thereof, an imide group thereof, an azide group thereof, a halide group thereof, an oxazoline group, a nitrile group, an epoxy group, an amino group, a hydroxyl group and a isocyanic acid ester group.

Examples of the component (B1) are an unsaturated carboxylic acid and its derivatives, an unsaturated epoxy compound, an unsaturated alcohol, an unsaturated amine and an unsaturated isocyanic acid ester.

Specific examples of the component (B1) are maleic acid, maleic anhydride, fumaric: acid, maleimide, maleic acid hydrazide, a reaction product of maleic anhydride with a diamine, which product is represented by the following formula, wherein R is an aliphatic group or an aromatic group,

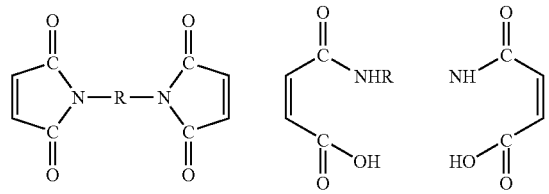

methyladic acid anhydride, dichloromaleic acid anhydride, maleic acid amide, itaconic acid, itaconic acid anhydride, natural oils and fats (for example, soybean oil, tung oil, castor oil, linseed oil, falx oil, cotton oil, sesame oil, rapeseed oil, peanut oil, camellia oil, olive oil, coconut oil and sardine oil), epoxidized natural oils and fats an unsaturated carboxylic acid (for example, acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexene, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-hexadienoic acid, dially acetate, geranic acid, 2,4-decadienoic acid, 2,4-dodecadienoic acid, 9,12-hexadecadtenoic acid, 9,12-octadecadienoic acid, hexadecatrienoic acid, eicosadienoic acid, eicosadienoic acid, eicosatetraenoic acid, ricinoleic acid, eleostearic acid, oleic acid, eicosapentaenoic acid, erucic acid, docosadienoic acid, docosatrienoic acid, docosatetraenoic acid, docosapentaenoic acid, tetracosenoic acid, hexacosenoic acid, hexacodienoic acid and octacosenoic acid), unsaturated carboxylic acid esters, unsaturated carboxylic acid amides, unsaturated carboxylic acid anhydrides, unsaturated alcohols (for example, allyl alcohol, crotyl alcohol, methylvinyl carbinol, ally carbinol, methylpropenyl carbinol, 4-penten-1-ol, 10-undecen-1-ol, propargyl alcohol, 1,4-pentadien-3-ol, 1,4-hexadien-3-ol, 3,5-hexadien-2-ol, 2,4-hexadien-1-ol, alcohols represented by the formulas $C_nH2_{n-5}OH$, $C_nH_{2n-7}OH$ and $C_nH_{2n-9}OH$ (n is a positive integer), 3-buten-1,2-diol, 2,5-dimethyl-3-hexen-2,5-diol, 1,5-hexadien-3,4-dioland2,6-octadien-4,5-diol), unsaturated amines obtained by replacing an OH group in unsaturated alcohols with an —$NH_2$ group, glycidyl (math) acrylate, ally glycidyl ether, products obtained by (1) adding maleic anhydride or phenols to low molecular weight polymers of butadiene or isoprene (for example, those having an average molecular weight of from 500 to 10000) or high molecular weight polymers thereof (for example, those having an average molecular weight of not less than 10000) or (2) introducing an amino group, a carboxyl group, a hydroxyl group or an epoxy group thereto, and ally isocyanate.

Among them, maleic anhydride, maleic acid, fumaric acid, itaconic anhydride, itaconic acid, glycidyl (meth)acrylate or 2-hydroxyethylmethacrylate is preferable.

Examples of the alkyl group of R in the component (B2) are a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a hanodecyl group and an eicosyl group. Examples of the aryl group of R therein are a phenyl group, a tolyl group, a xylyl group, a biphenyl group, a naphthyl group, an anthryl group and a phenanthryl group. Examples of the acyl group of R th rein are a formyl group, an acetyl group, a propionyl group, a butyryl group, a valeryl group, a palmitoyl group, a stearoyl group, an oleoyl group, an oxalyl group, a malonyl group, a succinyl group, a benzoyl group, a toluoyl group, a salicyloyl group, a cinnamoyl group, a naphthoyl group, a phthaloyl group and a furoyl group.

Examples of the component (B2) are an aliphatic polycarboxylic acid, its ester and its amide.

More specific examples of the component (B2) are a saturated aliphatic polycarboxylic acid represented by the formula $(R_1O)R'(COOR_2)_n(CONR_3R_4)_L$ (in the formula, R' is a linear or branched saturated aliphatic hydrocarbon group having 2 to 20 carbon atoms, and preferably 2 to 10 carbon atoms; $R_1$ is hydrogen, an alkyl group, an aryl group, an acyl group or a carbonyldioxy group, and preferably hydrogen; $R_2$ is hydrogen, an alkyl group or an aryl group having 1 to 20 carbon atoms, and preferably 1 to 10 carbon atoms; $R_3$ and $R_4$ is hydrogen, an alkyl group or an aryl group having 1 to 10 carbon atoms, preferably 1 to 6 carbon atoms, and further preferably 1 to 4 carbon atoms; n+L is an integer of not less than 2, and preferably 2 or 3; n is an integer of not less than 0; L is an integer of not less than 0; $R_1O$ is positioned at an α-position or a β-position for the carbonyl group; and 2 to 6 carbon atoms exist between at least two carbonyl groups), and its derivatives.

Further specific examples of the component (B2) are an ester compound of a saturated aliphatic polycarboxylic acid, an amide compound thereof, an anhydride thereof, a hydrate thereof and a salt thereof. Examples of the saturated aliphatic polycarboxylic acid are citric acid, malic acid and agaricic acid. These compounds are disclosed in detail in JP-W-61-502195.

The component (B2) is added in an amount of from 0.1 to 20 parts by weight, and preferably from 0.5 to 10 parts by weight per 100 parts by weight of the component (A). When said amount is less than 0.1 part by weight, a graft amount to the ethylene-vinylcyclohexane copolymer resin is low, and as a result, enough adhesive strength cannot be obtained. When said amount is more than 20 parts by weight, the obtained modified ethylene-vinylcyclohexane copolymer resin contains much of the component (B2) remaining unreacted, and as a result, enough adhesive strength cannot be obtained.

As the component (C) in the present invention, preferable is an organic peroxide having a decomposition temperature of from 50 to 210° C., at which temperature a half-life thereof is 1 minute. When said decomposition temperature is lower than 50° C., a graft amount is low, and when said decomposition temperature is higher than 210° C., decomposition of the component (A) is promoted, and as a result, a graft amount is low. As the component (C), preferable is an organic peroxide, which decomposes to generate a radical abstracting a proton from the component (A).

Examples of the organic peroxide having a decomposition temperature of from 50 to 210° C., at which temperature a half-life thereof is 1 minute, are diacyl peroxide compounds, dialkyl peroxide compounds, peroxyketal compounds, alkylperester compounds and percarbonate compounds. Specific examples thereof are dicetyl peroxydicarbonate, di-3-methoxybutyl peroxydicarbonate, di-2-ethylhexyl peroxydicarbonate, bis(4-t-butylcyclohexyl) peroxydicarbonate, diisopropyl peroxydicarbonate, t-butyl peroxyisopropylcarbonate, dimyristyl peroxycarbonate, 1,1,3,3-tetramethylbutyl neodecanoate, α-cumyl peroxyneodecanoate, t-butyl peroxyneodecanoate, 1,1-bis(t-butylperoxy) cyclohexane, 2,2-bis(4,4-di-t-butylperoxycyclohexyl) propane, 1,1-bis(t-butylperoxy)cyclododecane, t-hexylperoxyisopropyl monocarbonate, t-butylperoxy-3,5,5-trimethyl haxonoate, t -butylperoxylaurate, 2,5-dimethyl-2,5-di(bezoylperoxy)hexane, t-butylperoxyacetate, 2,2-bis(t-butylperoxy)butene, t-butylperoxybenzoate, 4,4-di-t-butylperoxy valeric acid n-butyl ester, di-t-butylperoxyisophthalate, dicumylperoxide, α-α'-bis(t-butylperoxy-m-isopropyl)benzene, 2,5-dimethyl-2,5-di(t-butylperoxy)hexane, 1,3-bis(t-butylperoxyisopropyl) benzene, t-butylcumylperoxide, di-t-butylperoxide, p-menthane hydroperoxide and 2,5-dimethyl-2,5-di(t-butylperoxy)hexyne-3. Among them, dialkyl peroxide compounds, diacyl peroxide compounds, percaxbonate compounds or alkylperester compounds are preferable.

The component (C) Is added in an amount of from 0.01 to 20 parts by weight, and preferably from 0.05 to 10 parts by weight per 100 parts by weight of the component (A).

The component (A) is preferably combined with a vinyl aromatic compound such as styrene and divinylbenzene.

The vinyl aromatic compound is added in an amount of from 0 to 15 parts by weight, and preferably from 0 to 7 parts by weight per 100 parts by weight of the component (A). The component (A) may be combined with additives (for example, antioxidants, heat stabilizers and neutralizers), which additives are generally used in combination with a resin comprising a propylene unit.

In the present invention, a method for producing the blend and a method of melt-kneading in a kneading apparatus may be those known in the art. A preferable method comprises the steps of (1) blending all of respective components in a lump, or separately in combination of some of them, in a blending apparatus such as a Henschel mixer, a ribbon blender and a blender to produce a homogeneous blend, and then (2) melt-kneading the blend in a kneading apparatus.

Examples of the kneading apparatus are those known in the art such as a Banbury mixer, a plastomil, a Brabender plastograph, a single-screw extruder and a twin-screw extruder. The single-screw or twin-screw extruder is particularly preferable in view of continuous production (namely, productivity).

Temperature in a melt-kneading zone of the kneading apparatus is generally from 50 to 300° C., and preferably from 80 to 270° C. When said temperature is lower than 50° C., a graft amount may be low, and when it is higher than 300° C., the component (A) may decompose. A preferable extruder has a former melt-kneading zone and a latter melt-kneading zone, wherein temperature in the latter zone is higher than that in the former zone. A melt-kneading period of time is from 0.1 to 30 minutes, and particularly preferably from 0.5 to 5 minutes. When said period of time is shorter than 0.1 minute, a graft amount may be insufficient, and when it is longer than 30 minutes, the component (A) may decompose.

EXAMPLE

The present invention is explained with reference to the following Examples, which do not limit the scope of the present invention.

Example 1

To 100 parts by weight of an ethylene-vinylcyclohexane copolymer resin (A) having a melt flow rate (MFR; 150° C. and 2.16 kgf) of 34 g/10 minutes and a vinylcyclohexane unit content of 16 mol%, 3.0 part by weight of maleic anhydride, 3.0 parts by weight of styrene, 0.12 part by weight of 1,3-bis(t-butylperoxyisopropyl)benzene (hereinafter, referred to as "C-1"; its decomposition temperature is 183° C., at which temperature a half-life thereof is 1 minute), 0.45 part by weight of dicetyl peroxydicarbonate (hereinafter, referred to as "C-2"; its decomposition temperature is 99° C., at which temperature a half-life thereof is 1 minute), 0.05 part by weight of calcium stearate and 0.3 part by weight of tetrakis[methylene-3-(3,5-di-t-butyl-4-hydroxyphenyl)propionate]methane (as an antioxidant) were added. The obtained mixture was blended thoroughly to obtain a blend. Said blend was melt-kneaded in a twin-screw extruder (L/D =25, a cylinder diameter =20 mm), Type 2D25-S, manufactured by Toyo Seiki Co., Ltd. under conditions of a screw rotating speed of 70 rpm, temperature in the former melt-kneading zone of 180° C., and that in the latter melt-kneading zone of 260° C., thereby obtaining a modified ethylene-vinylcyclohexane copolymer resin.

A graft amount of maleic acid contained in said modified ethylene-vinylcyclohexane copolymer resin was measured according to a method comprising the steps of:

(1) dissolving 1 gram of said resin in 20 ml of xylene to obtain a solution,
(2) dropping the solution into 300 ml of methanol under stirring to re-precipitate the resin,
(3) separating the resin re-precipitated by filtration,
(4) drying the resin separated in vacuo at 80° C. for 8 hours,
(5) hot-pressing the resin dried to obtain a film having a thickness of 100 μm,
(6) measuring an infrared absorption spectrum of the film, and
(7) determining an amount of grafted maleic acid (% by weight; a total amount of the resin is assigned to be 100% by weight) from the absorption near 1780 cm$^{-1}$.

Results are shown in Table 1.

Example 2

Example 1 was repeated to obtain a modified ethylene-vinylcyclohexene copolymer resin, except that the ethylene-vinylcyclohexene copolymer resin (A) was changed to an ethylene-vinylcyclohexene copolymer resin (B) having MPR (150° C. and 2.16 kgf) of 87 g/10 minutes. Results are shown in Table 1.

Comparative Example 1

Example 1 was repeated except that the ethylene-vinylcyclohexane copolymer resin (A) was changed to a polypropylene resin (A) having MFR (230° C. and 2.16 kgf) of 0.1 g/10 minutes. Results are shown in Table 1.

Comparative Example 2

Example 1 was repeated except that the ethylene-vinylcyclohexane copolymer resin (A) was changed to a polyethylene (A) having MFR (190° C., and 2.16 kgf) of 8 g/10 minutes. Results are shown in Table 1.

TABLE 1

|  | Example | | Comparative Example | |
| --- | --- | --- | --- | --- |
|  | 1 | 2 | 1 | 2 |
| Blending (parts by weight) | | | | |
| (A) Copolymer resin (A) | 100 | | | |
| Copolymer resin (B) | | 100 | | |
| Polypropylene resin (A) | | | 100 | |
| Polyethylene resin (A) | | | | 100 |
| (B) Maleic anhydride | 3.0 | 3.0 | 3.0 | 3.0 |
| (C) C-1 | 0.12 | 0.12 | 0.12 | 0.12 |
| C-2 | 0.45 | 0.45 | 0.45 | 0.45 |
| (D) Other | | | | |
| Styrene monomer | 3.0 | 3.0 | 3.0 | 3.0 |
| Evaluation result | | | | |
| Content of grafted maleic acid (% by weight) | 2.2 | 2.0 | 1.1 | 1.6 |

As explained above, in accordance with the present invention, there can be provided a process for producing a modified ethylene-vinylcyclohexane copolymer resin having a large graft amount.

The invention claimed is:

1. A process for producing a modified ethylene-vinylcyclohexane copolymer resin, which comprises the steps of:
   (1) blending, at least the following components (A) to (C) to produce a blend:

(A) 100 parts by weight of an ethylene-vinylcyclohexane copolymer resin,
(B) from 0.1 to 20 parts by weight of at least one compound selected from the group consisting of:
(B1) a compound having in its molecule (i) at least one carbon-carbon double or triple bond and (ii) at least one polar group, and
(B2) a compound having in its molecule (iii) an OR group and (iv) at least two same or different functional groups selected from the group consisting of a carboxylic acid group, an acid halide group, an acid anhydride group, an acid halide anhydride group, an acid ester group, an acid amide group, an imide group, an imido group, an amino group and a salt of an amino group, wherein the R is hydrogen, an alkyl group, an aryl group, an acyl group or a carbonyldioxy group, and
(C) from 0.01 to 20 parts by weight of a combination of a dialkyl peroxide compound with a percabonate compound, and
(2) melt-kneading said blend for 0.5 to 5 minutes in a kneading apparatus to produce a modified ethylene-vinylcyclohexane copolymer resin, the kneading apparatus has a single-screw or twin-screw extruder, and having a former melt-kneading zone and a latter melt-kneading zone, wherein temperature in the latter melt-kneading zone is higher than that in the former melt-kneading zone.

2. The process for producing a modified ethylene-vinylcyclohexane copolymer resin according to claim 1, wherein the component (B) contains maleic anhydride, maleic acid, fumaric acid, itaconic anhydride, itaconic acid, glycidyl (meth)acrylate or 2-hydroxyethylmethacrylate.

3. The process for producing a modified ethylene-vinylcyclohexane copolymer resin according to claim 1, wherein the component (A) contains a combination of an ethylene-vinylcyclohexane copolymer resin with a vinyl aromatic compound.

4. The process for producing a modified ethylene-vinylcyclohexane copolymer resin according to claim 3, wherein the vinylcyclohexane unit is contained in the ethylene-vinylcylcohexane copolymer resin in an amount of from 1 to 30 mol %.

* * * * *